(12) United States Patent
Lee

(10) Patent No.: US 9,555,826 B2
(45) Date of Patent: Jan. 31, 2017

(54) SAFETY APPARATUS FOR STEER-BY-WIRE

(71) Applicant: MANDO CORPORATION, Pyeongtaek-si, Gyeonggi-do (KR)

(72) Inventor: Kwon Ho Lee, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 25 days.

(21) Appl. No.: 14/688,137

(22) Filed: Apr. 16, 2015

(65) Prior Publication Data
US 2015/0298723 A1 Oct. 22, 2015

(30) Foreign Application Priority Data
Apr. 16, 2014 (KR) .................. 10-2014-0045266

(51) Int. Cl.
*F16D 11/14* (2006.01)
*B62D 5/00* (2006.01)

(52) U.S. Cl.
CPC .............. *B62D 5/003* (2013.01); *F16D 11/14* (2013.01); *F16D 2300/18* (2013.01)

(58) Field of Classification Search
USPC ..................................................... 192/69.62
See application file for complete search history.

(56) References Cited

U.S. PATENT DOCUMENTS

| | | | | |
|---|---|---|---|---|
| 232,926 A * | 10/1880 | Berkholz | ............... | F16D 11/14 112/283 |
| 1,686,042 A * | 10/1928 | Steele | ..................... | B21B 31/24 192/48.5 |
| 1,753,300 A * | 4/1930 | Peterson | ................. | F16D 11/10 192/69.62 |
| 2,045,572 A * | 6/1936 | Dow | ................... | F16D 43/2026 192/114 R |
| 2,291,851 A * | 8/1942 | Wahlberg | ............... | F16D 11/10 192/108 |
| 2,619,211 A * | 11/1952 | Belden | ..................... | F16D 3/70 192/114 R |
| 6,138,788 A * | 10/2000 | Bohner | ................. | B62D 5/006 180/402 |
| 6,442,462 B1* | 8/2002 | Nishizaki | .............. | B62D 5/006 180/402 |
| 7,322,439 B2* | 1/2008 | Hara | ....................... | B62D 5/003 180/402 |
| 2012/0234644 A1* | 9/2012 | Rosemeier | ............. | F16D 11/14 192/69.7 |
| 2015/0090519 A1* | 4/2015 | D'Amato | ............. | B65D 5/0409 180/446 |

* cited by examiner

*Primary Examiner* — Robert A Siconolfi
*Assistant Examiner* — Ryan Dodd
(74) *Attorney, Agent, or Firm* — Hauptman Ham, LLP (57) ABSTRACT

The present invention relates to a safety apparatus for a steer-by-wire. The present invention can ensure the safety of a steer-by-wire using a simple and compact structure and achieve a manufacturing-cost reduction effect.

8 Claims, 7 Drawing Sheets

SAFETY APPARATUS FOR STEER-BY-WIRE

CROSS-REFERENCE TO RELATED APPLICATION

This application claims priority from and the benefit under 35 U.S.C. §119(a) of Korean Patent Application No. 10-2014-0045266, filed on Apr. 16, 2014, which is hereby incorporated by reference for all purposes as if fully set forth herein.

BACKGROUND OF THE INVENTION

1. Field of the Invention

The present invention relates to a safety apparatus for a steer-by-wire and, more specifically, to a safety apparatus for a steer-by-wire that can ensure the safety of a steer-by-wire using a simple and compact structure and can be manufactured at a low cost.

2. Description of the Prior Art

A steer-by-wire (SBW) refers to an apparatus that controls steering using hydraulic pressure or auxiliary electric power only through an electric signal instead of a mechanical structure connecting the rotation of a steering wheel and the rotation of wheels.

The SBW generally includes a steering angle sensor on a steering input side thereof and a steering output sensor and a steering actuator on a steering output side thereof. The steering angle sensor detects a steering angle, the steering output sensor detects the rotation angle of a wheel, and the steering actuator generates an auxiliary power to rotate the wheel.

When a driver turns a steering wheel, the steering angle sensor detects the number of turns of the steering wheel to transmit the same to an electronic control unit (ECU), and the ECU controls the steering actuator, which can rotate the wheel, to generate steering output.

However, in the SBW system, fatal errors may be caused by a non-steerable state in which an electric signal is not provided due to a short circuit or a contact failure of a wire on a signal path through which steering is detected and transferred to an actuator, and thus a driver's steering intention is not correctly transferred to the wheel, or in which the steering actuator or the electronic control unit breaks down and malfunctions.

A backup clutch driving apparatus for a steer-by-wire is exemplified as an example of a safety apparatus for preventing such problems from arising.

Figure 1:
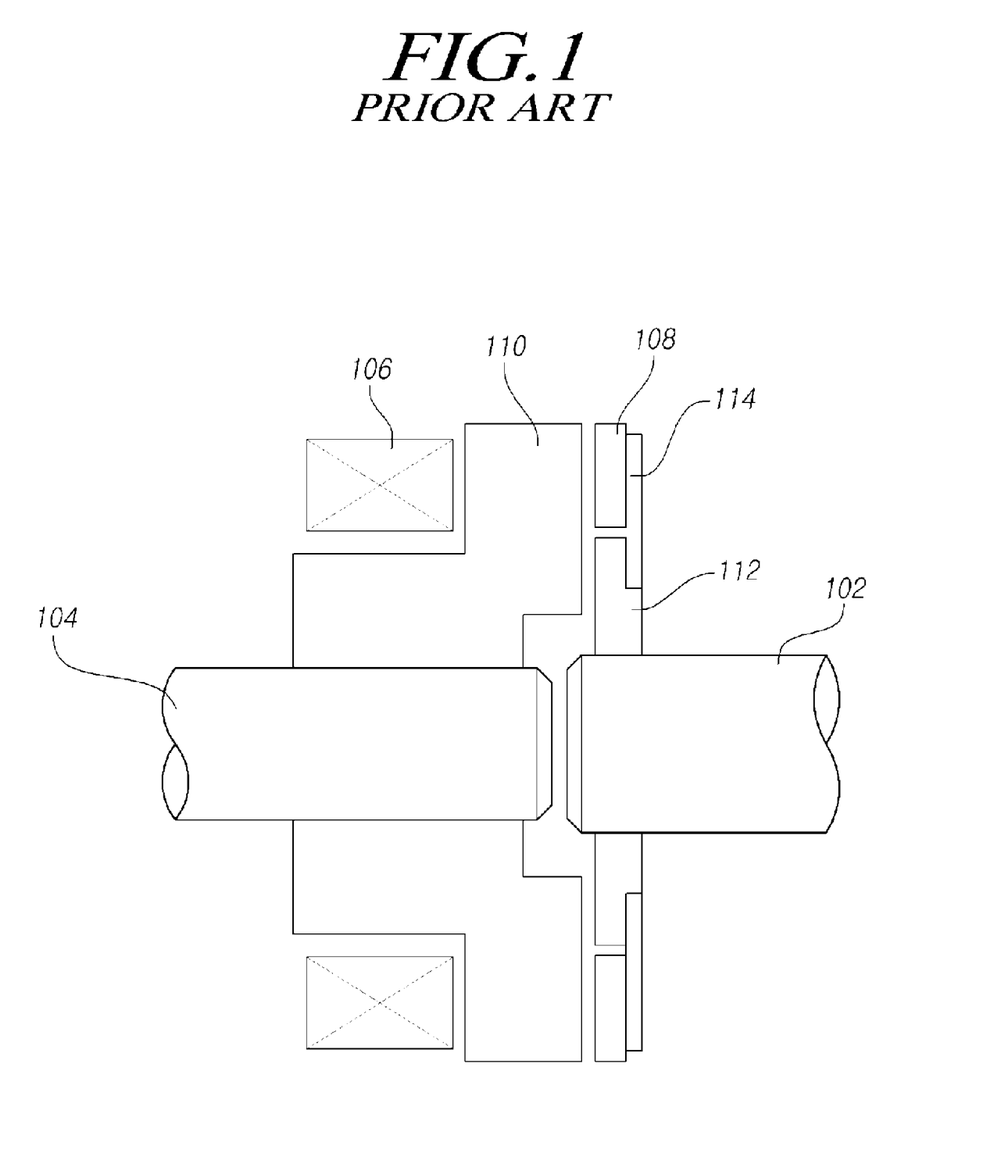
FIG. 1 illustrates a backup clutch driving apparatus for a steer-by-wire according to the related art.

FIG. 1 illustrates a backup clutch driving apparatus for a steer-by-wire according to the related art.

As illustrated in FIG. 1, the backup clutch driving apparatus for a steer-by-wire according to the related art includes a first column shaft 102, a second column shaft 104, an electromagnetic coil 106, an armature 108, an output-side hub 110, an armature hub 112, and a plate spring 114.

The armature hub 112 is secured to the first column shaft 102 connected to a steering wheel (not illustrated), and the plate spring 114 is connected to the armature hub 112.

The armature 108 is attached to the plate spring 114.

The output-side hub 110 is secured to the second column shaft 104 and surrounded by the electromagnetic coil 106.

When the steer-by-wire is operating normally, the first and second column shafts 102, 104 are mechanically separated from each other. Therefore, a driver's steering force which is transmitted to the first column shaft 102 is not mechanically transferred to the second column shaft 104.

However, when an error occurs in the steer-by-wire, a current is applied to the electromagnetic coil 106, thereby causing a magnetic field. The magnetic field attracts the armature 108 against the restoring force of the plate spring 114 so that the armature 108 is brought into contact with the output-side hub 110.

When the armature 108 is brought into contact with the output-side hub 110, the first and second column shafts 102, 104 are mechanically connected to each other and the driver's steering force is transmitted to wheels, thereby solving a fatal error caused by malfunction of the steer-by-wire.

However, the backup clutch driving apparatus for a steer-by-wire according to the related art has a complex structure, and the electromagnetic coil employed for the backup clutch driving apparatus for a steer-by-wire has limitations due to its small driving force in cases where a large driving force is required and its high production cost is a drawback.

SUMMARY OF THE INVENTION

The present invention has been conceived to solve such problems in the related art, and an aspect of the present invention is to provide a safety apparatus for a steer-by-wire that can ensure the safety of a steer-by-wire using a simple and compact structure and can be manufactured at a low cost.

The aspect of the present invention is not limited thereto, and other unmentioned aspects of the present invention may be clearly appreciated by those skilled in the art from the following descriptions.

In accordance with one aspect of the present invention, a safety apparatus for a steer-by-wire includes: a first rotating plate formed on an end portion of any one of an input shaft and an output shaft that are separated from each other, wherein the first rotating plate has a through hole formed at a position spaced apart from the center thereof and is provided with a first position detecting sensor; a second rotating plate formed on an end portion of the other of the input shaft and the output shaft to face the first rotating plate, wherein the second rotating plate has an actuator coupled thereto and is provided with a second position detecting sensor interacting with the first position detecting sensor, and the actuator includes a load part that is inserted into or extracted from the through hole; and a controller that receives a signal for a relative rotation angle between the first and second rotating plates from the first and second position detecting sensors and controls the actuator to extract the load part from the through hole when the steer-by-wire is operating normally and to insert the load part into the through hole when the steer-by-wire malfunctions.

As described above, according to the embodiment, it is possible to ensure the safety of a steer-by-wire using a simple and compact structure and to achieve a manufacturing-cost reduction effect.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the exemplary drawings. In the following description, It should be appreciated that when one component is described as being "connected," "coupled" or "joined" to another component, a third component may be "connected," "coupled," and "joined" between the first and second components, although the first component may be directly connected, coupled or joined to the second component.

Figure 2:
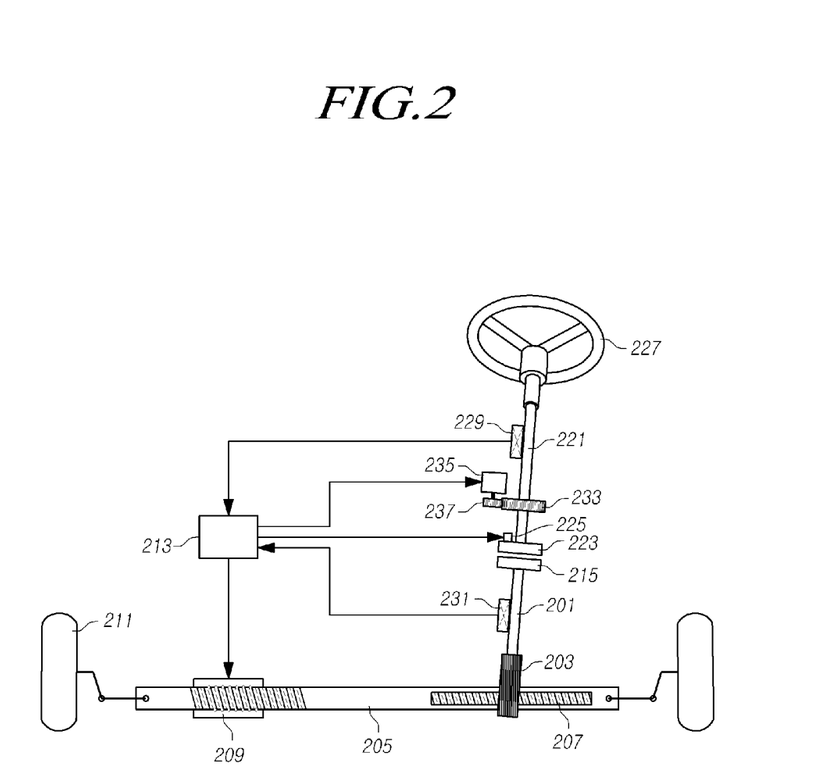
FIG. 2 illustrates a structure of a steering apparatus having a safety apparatus for a steer-by-wire applied thereto according to an embodiment of the invention.
Figure 3:
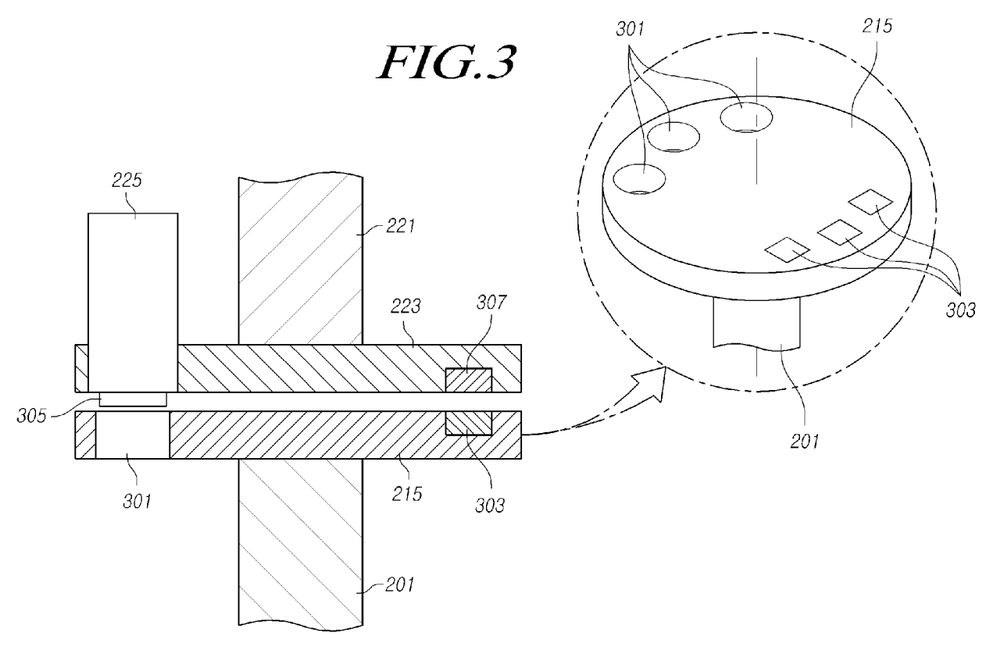
FIG. 3 is a fragmentary sectional view and a perspective view of a safety apparatus for a steer-by-wire according to an embodiment of the invention.
Figure 4:
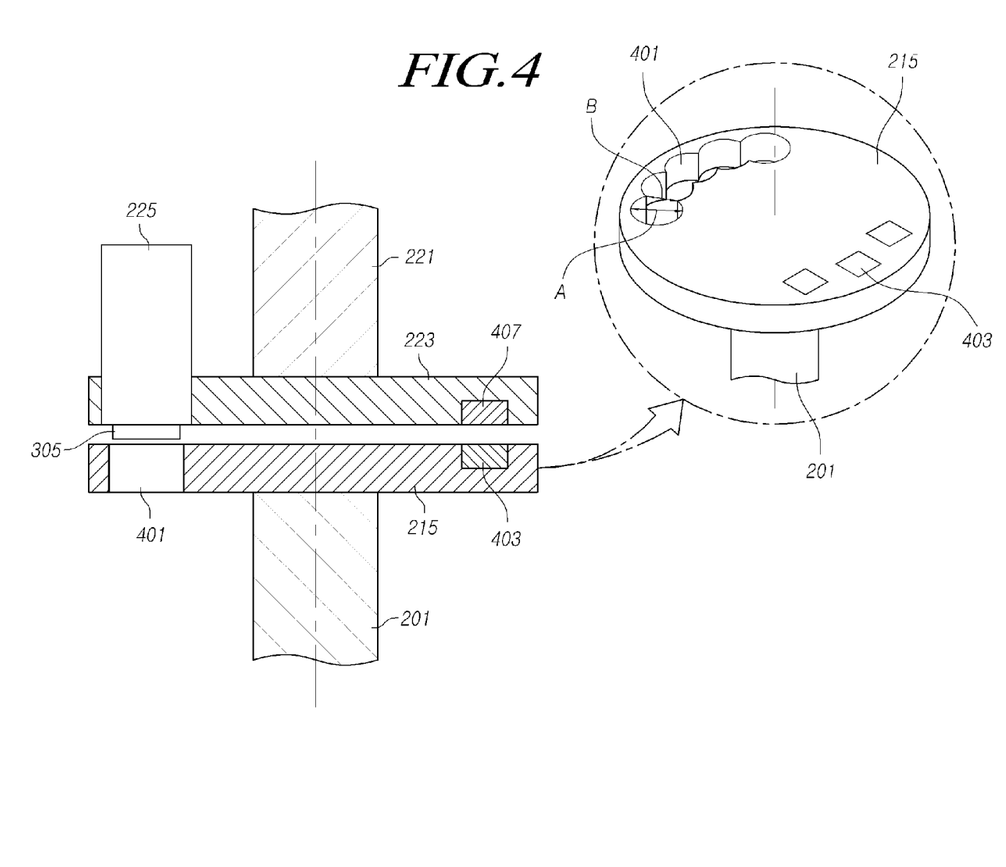
FIG. 4 is a fragmentary sectional view and a perspective view of a safety apparatus for a steer-by-wire according to another embodiment of the invention.
Figure 5:
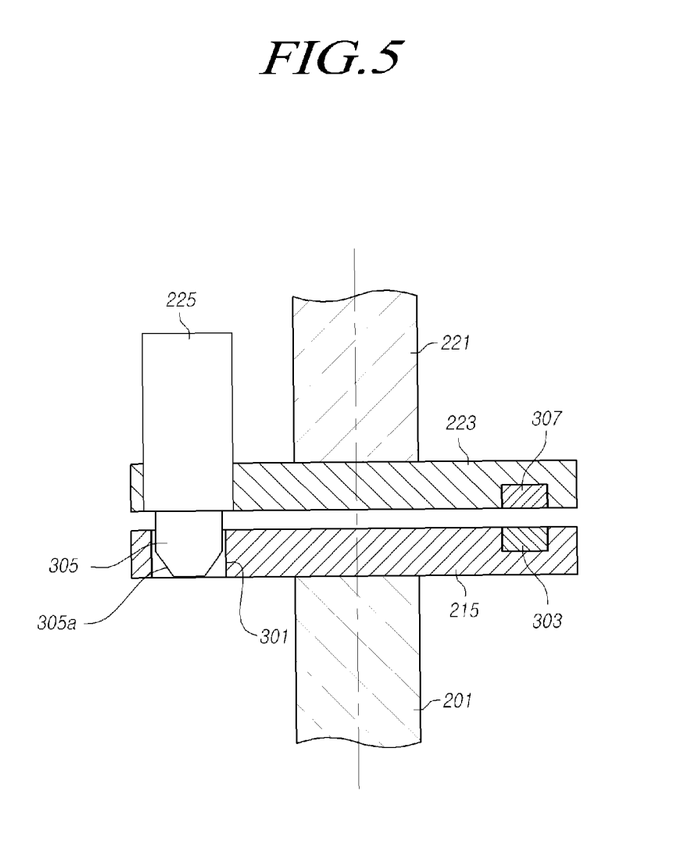
FIGS. 5 and 6 are fragmentary sectional views of a safety apparatus for a steer-by-wire according to embodiments of the invention.
Figure 6:
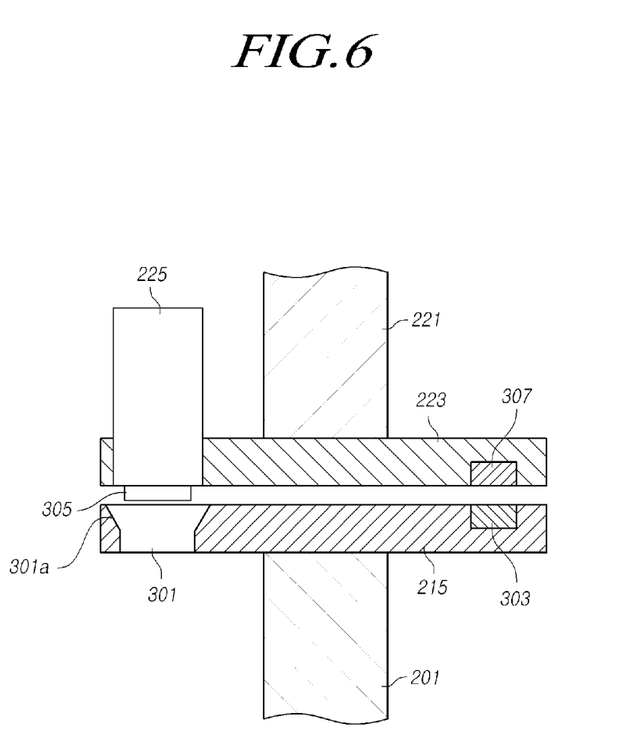
Figure 7:
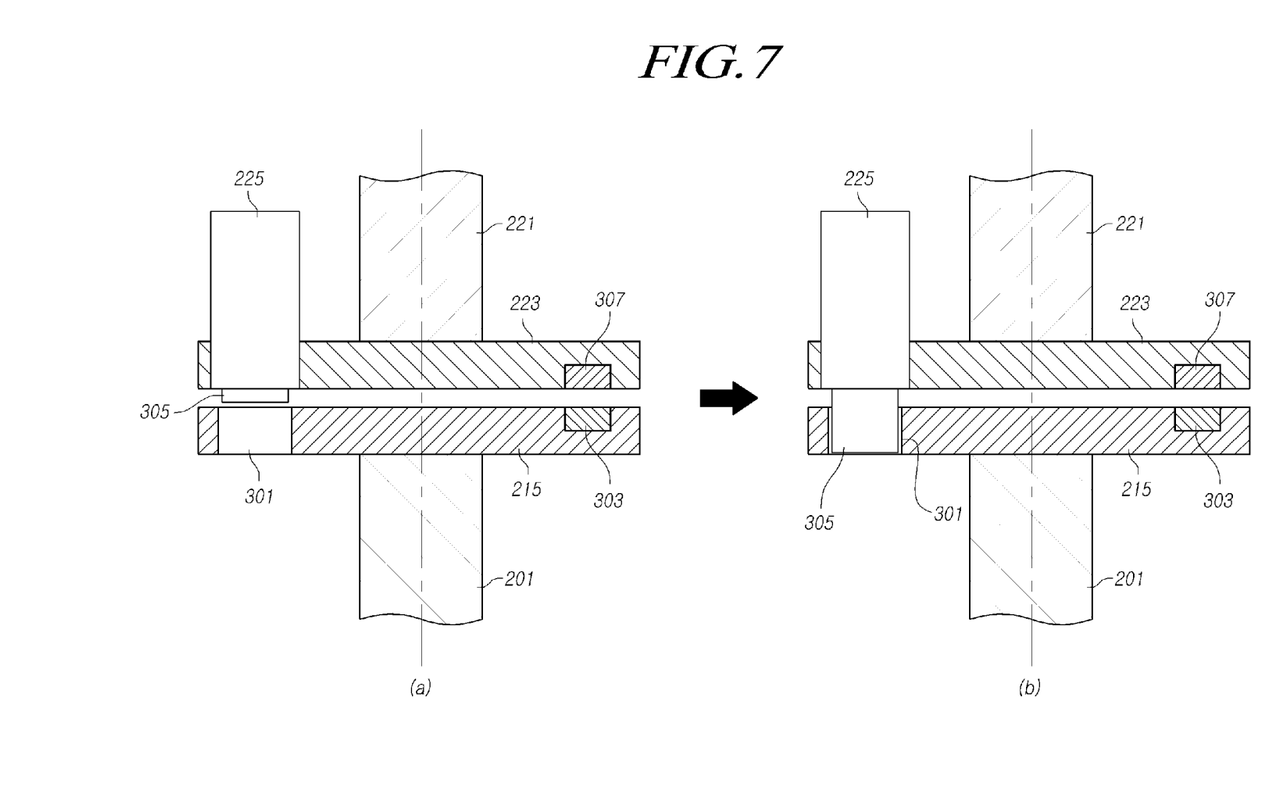
FIG. 7 is a fragmentary sectional view illustrating an operating state of a safety apparatus for a steer-by-wire according to an embodiment of the invention.

FIG. 2 illustrates a structure of a steering apparatus having a safety apparatus for a steer-by-wire applied thereto according to an embodiment of the invention, FIG. 3 is a fragmentary sectional view and a perspective view of a safety apparatus for a steer-by-wire according to an embodiment of the invention, FIG. 4 is a fragmentary sectional view and a perspective view of a safety apparatus for a steer-by-wire according to another embodiment of the invention, FIGS. 5 and 6 are fragmentary sectional views of a safety apparatus for a steer-by-wire according to embodiments of the invention, and FIG. 7 is a fragmentary sectional view illustrating an operating state of a safety apparatus for a steer-by-wire according to an embodiment of the invention.

As illustrated in the drawings, a safety apparatus for a steer-by-wire according to an embodiment of the present invention includes: a first rotating plate 215 formed on an end portion of any one of an input shaft 221 and an output shaft 201 that are separated from each other, wherein the first rotating plate 215 has a through hole 301 formed at a position spaced apart from the center thereof and is provided with a first position detecting sensor 303; a second rotating plate 223 formed on an end portion of the other of the input shaft 221 and the output shaft 201 to face the first rotating plate 215, wherein the second rotating plate 223 has an actuator 225 coupled thereto and is provided with a second position detecting sensor 307 interacting with the first position detecting sensor 303, and the actuator 225 includes a load part 305 that is inserted into or extracted from the through hole 301; and a controller 213 that receives a signal for a relative rotation angle between the first and second rotating plates 215, 223 from the first and second position detecting sensors 303, 307 and controls the actuator 225 to extract the load part 305 from the through hole 301 when the steer-by-wire is operating normally and to insert the load part 305 into the through hole 301 when the steer-by-wire malfunctions.

Although it will be hereinafter exemplified that the first rotating plate 215 is formed on an end portion of the output shaft 201 and the second rotating plate 223 is formed on an end portion of the input shaft 221, the reverse is possible.

A pinion gear 203 formed on the lower end portion of the output shaft 201 is engaged with a rack gear 207 formed on a rack bar 205. A driving motor 209 is coupled to the rack bar 205, and the rack bar 205 is linearly moved to the left and right by the driving force of the driving motor 209 to steer wheels 211.

The driving motor 209 receives a control signal from the controller 213 and generates a driving force for moving the rack bar 205 leftwards and rightwards.

That is, the controller 213 receives signals from a first sensor 229 disposed on the input shaft 221, a second sensor 231 disposed on the output shaft 201, and other various types of sensors and controls the driving motor 209 to satisfy the moving distance of the rack bar 205 corresponding to the rotation angle of a steering wheel 227.

The first rotating plate 215 is coupled to the upper end portion of the output shaft 201 and has the through hole 301 formed therein and the first position detecting sensor 303.

Here, the through hole 301 may be formed at a position spaced apart from the center of the first rotating plate 215, and the first position detecting sensor 303 may be disposed to be symmetric to the through hole 301 with respect to the center of the first rotating plate 215.

Meanwhile, according to the embodiment of the present invention illustrated in FIG. 3, a plurality of through holes 301 and first position detecting sensors 303 may be formed along the circumferential direction of the first rotating plate 215. Here, as illustrated in FIG. 4, a plurality of through holes 401 may be formed in such a manner that the adjacent ones overlap each other.

That is, as illustrated in FIG. 3, the plurality of through holes 301 may be adjacently formed to be spaced apart from each other in the circumferential direction of the first rotating plate 215. Alternatively, as illustrated in FIG. 4, the plurality of through holes 401 may be formed in such a manner that the adjacent ones overlap each other, whereby wide sections A and narrow sections B may be alternately formed in the circumferential direction and the upper and lower surfaces of the first rotating plate 215 may be communicated with each other.

Particularly, in cases where the through holes 401 are formed in such a manner that the adjacent ones overlap each other as illustrated in FIG. 4, the rack gear 207 formed on the rack bar 205 may be formed as, for example, a variable gear. Accordingly, even though an interval exists where the rotation angles of the input and output shafts 221, 201 are different from each other, the load part 305 of the actuator 225 can be effectively inserted into or extracted from the through holes 401 in cases where an error in the steer-by-wire arises, thereby sufficiently ensuring steering stability.

When the load part 305 of the actuator 225 is extracted from the though holes 401 due to an error in the steer-by-wire, a special case may occur in which the load part 305 is stopped by the narrow sections B of the through holes 401. However, since a predetermined relative rotation angle interval (namely, an angle interval where the output shaft 201 does not rotate in conjunction with the input shaft 221 even though a driver turns the steering wheel 227 by a predetermined angle to rotate the input shaft 221) exists between the input and output shafts 221, 201, a case does not occur where the load part 305 is stopped by the narrow sections B of the through holes 401 so that the safety apparatus for the steer-by-wire incompletely operates.

That is, even though the aforementioned special situation occurs, if the driver slightly rotates the steering wheel 227 without realizing it, the load part 305 departs from the narrow section B of the through holes 401 and then enters the wide section A thereof in the process in which the input shaft 221 connected to the steering wheel 227 is rotated.

Therefore, the aforementioned incomplete operation of the safety apparatus for the steer-by-wire does not occur.

Meanwhile, referring to FIGS. 3 and 4, a plurality of first position detecting sensors 403 may be disposed to be spaced apart from each other in the circumferential direction in the first rotating plate 215 having the through holes 401 formed therein.

The input shaft 221 connected to the steering wheel 227 is rotated in conjunction with the steering wheel 227 when the driver turns the steering wheel 227.

The second rotating plate 223 is coupled to the lower end portion of the input shaft 221 and is provided with the actuator 225 and the second position detecting sensor 307.

The actuator 225 includes the load part 305 which is inserted into or extracted from the through holes 301 of the first rotating plate 215. The through holes 301 have a slightly larger diameter than the load part 305 so that the load part 305 may be accurately inserted into the through holes 301 in case of emergency. The actuator 225 may be, for example, a solenoid valve.

The second position detecting sensor 307 is disposed in the second rotating plate 223 to interact with the first position detecting sensor 303 disposed in the first rotating plate 215. The first and second position detecting sensors 303, 307 may be, for example, a magnet sensor and are disposed to face each other when the safety apparatus for the steer-by-wire, according to the embodiment of the present invention, is mounted to a vehicle.

As illustrated in FIGS. 3 and 4, in cases where the plurality of first position detecting sensors 403 are provided, a plurality of second position detecting sensors 407 are also provided on the second rotating plate 223 to correspond to the first position detecting sensors 403.

Furthermore, as illustrated in FIG. 5, the load part 305 may have, on an end portion thereof, a diameter reducing portion 305a which has a gradually decreasing outer diameter, or as illustrated in FIG. 6, the through holes 301 may have, on an end portion thereof, a diameter expanding portion 301a which has a gradually increasing inner diameter and where the load part 305 is inserted. Alternatively, the load part 305 may have the diameter reducing portion 305a and, at the same time, the through holes 301 may have the diameter expanding portion 301a.

In this way, the load part 305 has the diameter reducing portions 305a, and/or the through holes 301 have the diameter expanding portion 301a. Accordingly, when the first and second rotating plates 215, 223 are not situated at the correct positions, even though the driver slightly turns the steering wheel 227, the load part 305 of the actuator may be easily inserted into the through holes 301.

When the safety apparatus for the steer-by-wire, according to the embodiment of the present invention, is mounted to a vehicle, the first and second position detecting sensors 303, 307 are set to face each other, and the controller 213 may determine that the first and second rotating plates 215, 223 are initially disposed at the correct positions where the load part 305 of the actuator 225 may be inserted into the through hole 301.

When the first and second rotating plates 215, 223 depart from a preset relative rotation angle range, the controller 213 may also identify the state.

The controller 213 receives a signal for a relative rotation angle between the first and second rotating plates 215, 223 from the first and second position detecting sensors 303, 307 and controls the actuator 225 to extract the load part 305 from the through hole 301 when the steer-by-wire is operating normally (see FIG. 7 (a)) and to insert the load part 305 into the through hole 301 when the steer-by-wire malfunctions (see FIG. 7(b)).

That is, only when the steer-by-wire malfunctions, the controller 213 controls the actuator 225 to insert the load part 305 of the actuator 225 into the through hole 301 so that the input and output shafts 221, 201 are physically connected to each other, thereby making it possible for a driver to manually steer the wheels 211 in case of emergency (e.g., a case where a vibration of 0.13 g or more is consistently generated in the steering wheel for 20 ms or more).

The controller 213 determines whether the steer-by-wire is operating normally based on signals transmitted from the first and second sensors 229, 231 for detecting the rotation angles of the input and output shafts 221, 201, respectively, and signals transmitted from other various sensors.

Meanwhile, a first gear 233 is mounted on the input shaft 221 and engaged with a second gear 237 connected to the shaft of a motor 235, and the controller 213 controls the motor 235 to give a driver a feeling of general steering while driving a vehicle.

As described above, according to the embodiment, it is possible to ensure the safety of a steer-by-wire using a simple and compact structure and to achieve a manufacturing-cost reduction effect.

Even if it was described above that all of the components of an embodiment of the present invention are coupled as a single unit or coupled to be operated as a single unit, the present invention is not necessarily limited to such an embodiment. The scope of the present invention shall be construed on the basis of the accompanying claims in such a manner that all of the technical ideas included within the scope equivalent to the claims belong to the present invention.

What is claimed is:

1. A safety apparatus for a steer-by-wire comprising:
a first rotating plate formed on an end portion of any one of an input shaft and an output shaft that are separated from each other, wherein the first rotating plate has a through hole formed at a position spaced apart from the center thereof and is provided with a first position detecting sensor;
a second rotating plate formed on an end portion of the other of the input shaft and the output shaft to face the first rotating plate, wherein the second rotating plate has an actuator coupled thereto and is provided with a second position detecting sensor interacting with the first position detecting sensor, and the actuator comprises a load part that is inserted into or extracted from the through hole; and
a controller that receives a signal for a relative rotation angle between the first and second rotating plates from the first and second position detecting sensors and controls the actuator to extract the load part from the through hole when the steer-by-wire is operating normally and to insert the load part into the through hole when the steer-by-wire malfunctions, wherein a plurality of through holes are formed along the circumferential direction of the first rotating plate, and, wherein the plurality of through holes are formed in such a manner that the adjacent ones overlap each other.

2. The safety apparatus for a steer-by-wire of claim 1, wherein the first position detecting sensor is disposed to be symmetric to the through hole with respect to the center of the first rotating plate.

3. The safety apparatus for a steer-by-wire of claim 1, wherein the first and second position detecting sensors are disposed to face each other.

4. The safety apparatus for a steer-by-wire of claim 1, wherein a plurality of first position detecting sensors are disposed to be spaced apart from each other in the circumferential direction of the first rotating plate.

5. The safety apparatus for a steer-by-wire of claim 4, wherein a plurality of second position detecting sensors are disposed to face the first position detecting sensors.

6. The safety apparatus for a steer-by-wire of claim 1, wherein the load part has, on an end portion thereof, a diameter reducing portion that has a gradually decreasing outer diameter.

7. The safety apparatus for a steer-by-wire of claim 1, wherein the through hole has, on an end portion thereof, a diameter expanding portion which has a gradually increasing inner diameter and where the load part is inserted.

8. The safety apparatus for a steer-by-wire of claim 1, wherein the load part has, on an end portion thereof, a diameter reducing portion that has a gradually decreasing outer diameter, and the through hole has, on an end portion thereof, a diameter expanding portion which has a gradually increasing inner diameter and where the load part is inserted.

* * * * *